United States Patent
Tsotsis (10) Patent No.: US 9,950,480 B2
(45) Date of Patent: Apr. 24, 2018

(54) COMPOSITE STRUCTURE AND METHODS OF ASSEMBLING SAME

(75) Inventor: Thomas Karl Tsotsis, Santa Ana, CA (US)

(73) Assignee: The Boeing Company, Chicago, IL (US)

( * ) Notice: Subject to any disclaimer, the term of this patent is extended or adjusted under 35 U.S.C. 154(b) by 195 days.

(21) Appl. No.: 13/416,851

(22) Filed: Mar. 9, 2012

(65) Prior Publication Data

US 2013/0236664 A1    Sep. 12, 2013

(51) Int. Cl.
*B29D 22/00* (2006.01)
*B29C 70/54* (2006.01)
*B29C 70/68* (2006.01)

(52) U.S. Cl.
CPC ............ *B29C 70/542* (2013.01); *B29C 70/68* (2013.01); *Y10T 428/13* (2015.01)

(58) Field of Classification Search
CPC ...... B29C 70/542; B29C 70/68; F16L 11/121; Y10T 428/13
USPC ....................................................... 428/36.1
See application file for complete search history.

(56) References Cited

U.S. PATENT DOCUMENTS

| | | | |
|---|---|---|---|
| 3,490,219 A * | 1/1970 | Goro et al. | D01H 1/115 156/180 |
| 5,209,136 A * | 5/1993 | Williams | 74/502.5 |
| 5,619,903 A | 4/1997 | Rogers et al. | |
| 8,042,767 B2 | 10/2011 | Velicki et al. | |
| 8,807,174 B2 * | 8/2014 | Martucci | 138/129 |
| 2009/0057487 A1 | 3/2009 | Velicki et al. | |
| 2009/0229452 A1 * | 9/2009 | Milwich | B29C 70/085 87/7 |
| 2011/0039057 A1 | 2/2011 | Frisch et al. | |

FOREIGN PATENT DOCUMENTS

| | | |
|---|---|---|
| GB | 2222653 A | 3/1990 |
| JP | 63-54239 A | 3/1988 |

OTHER PUBLICATIONS

European Search Report of application No. 13157747.0; dated Jun. 28, 2013; 6 pages.

* cited by examiner

*Primary Examiner* — James C Yager
(74) *Attorney, Agent, or Firm* — Armstrong Teasdale LLP

(57) ABSTRACT

A composite structure and method of assembling a composite structure is provided. The composite structure includes a base member having an outer surface and an inner surface. The inner surface defines a channel therethrough. The composite structure further includes a support member coupled to the outer surface. A fabric overwrap is coupled to the support member.

11 Claims, 7 Drawing Sheets

COMPOSITE STRUCTURE AND METHODS OF ASSEMBLING SAME

BACKGROUND OF THE INVENTION

The present disclosure relates generally to a composite structure and, more specifically, to composite structures utilized to support structural components, and methods of assembling the same.

Composite materials, consisting of fibers and resin, are used to produce a wide range of useful structural components. Such composite structures have advantages over structures fabricated from other materials such as, but not limited to, strength-to-weight ratios approaching those of structural alloys. Several processes for forming composite structures are common. Some of these known processes may require the formation of a "layup" or preform of fibrous material, which generally takes the contours of the finished structural components. This layup or preform may be formed of a fabric of structural fibers or of individual fibers themselves, and may be "laid up" against a mandrel, either manually or by a mechanized apparatus. In one such fabrication method, the preform can be formed by braiding a plurality of structural fibers about the mandrel.

Some composite structures have generally satisfactory tensile strength, but compressive strength that is only a fraction of the tensile strength. Known processes may use a secondary process wherein pultruded rods of fibers are positioned within the fibers, prior to the fibers being solidified or cured with resin into a rigid form to enhance compressive strength. In some known processes, the pultruded rod is inserted into the braid of structural fibers. More particularly, in such processes, the braided fibers are stitched to the structural component and the rod is pulled through the braided fibers. However, such a process may require time-consuming, complex, and/or costly maneuvering of the pultruded rods within and/or through the fibers. Moreover, in some composite structures, the integration of the pultruded rod, which has a different stiffness than the braided fibers, may result in microcracking between the pultruded rod and the surrounding resin. Furthermore, depending on the length of the pultruded rods, stress concentrations may occur near the rod such that any cracking and/or debonding may reduce the ability of a load force to be transferred between the rod and the structural component.

BRIEF DESCRIPTION OF THE INVENTION

In one aspect, a composite structure is provided. The composite structure includes a base member having an outer surface and an inner surface. The inner surface defines a channel therethrough. The composite structure further includes a support member coupled to the outer surface. A fabric overwrap is coupled to the support member after the support member is coupled to the outer surface.

In another aspect, a method of assembling a composite structure is provided. The method includes extruding a base member having an outer surface and inner surface. At least one of a pultruded rod and a unidirectional fiber tow is coupled to the outer surface. The method further includes coupling a fabric overwrap to at least one of the pultruded rod and the unidirectional fiber tow.

In a further aspect, a fuselage section is provided. The fuselage section includes a fuselage skin and a composite structure coupled to the fuselage skin. The composite structure includes a base member having an outer surface and an inner surface, wherein the inner surface defines a channel therethrough. A pultruded rod is coupled to the outer surface and a fabric overwrap is coupled to the pultruded rod after the pultruded rod is coupled to the outer surface.

The features, functions, and advantages that have been discussed can be achieved independently in various embodiments or may be combined in yet other embodiments further details of which can be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION OF THE INVENTION

The embodiments described herein relate to a resilient composite structure and methods of assembling the composite structure. Generally, the embodiments described herein relate to a self-supporting, lightweight support section for use in liquid molding that may be utilized with a plurality of materials to provide a composite structure having a predetermined stiffness and weight. Moreover, the composite structure may be utilized in a variety of environments such as, but not limited to, military, industrial and consumer environments. In one embodiment, the composite structure described herein is utilized with an aircraft fuselage. It should be understood that the description and figures that utilize fuselages are exemplary only.

Figure 1:
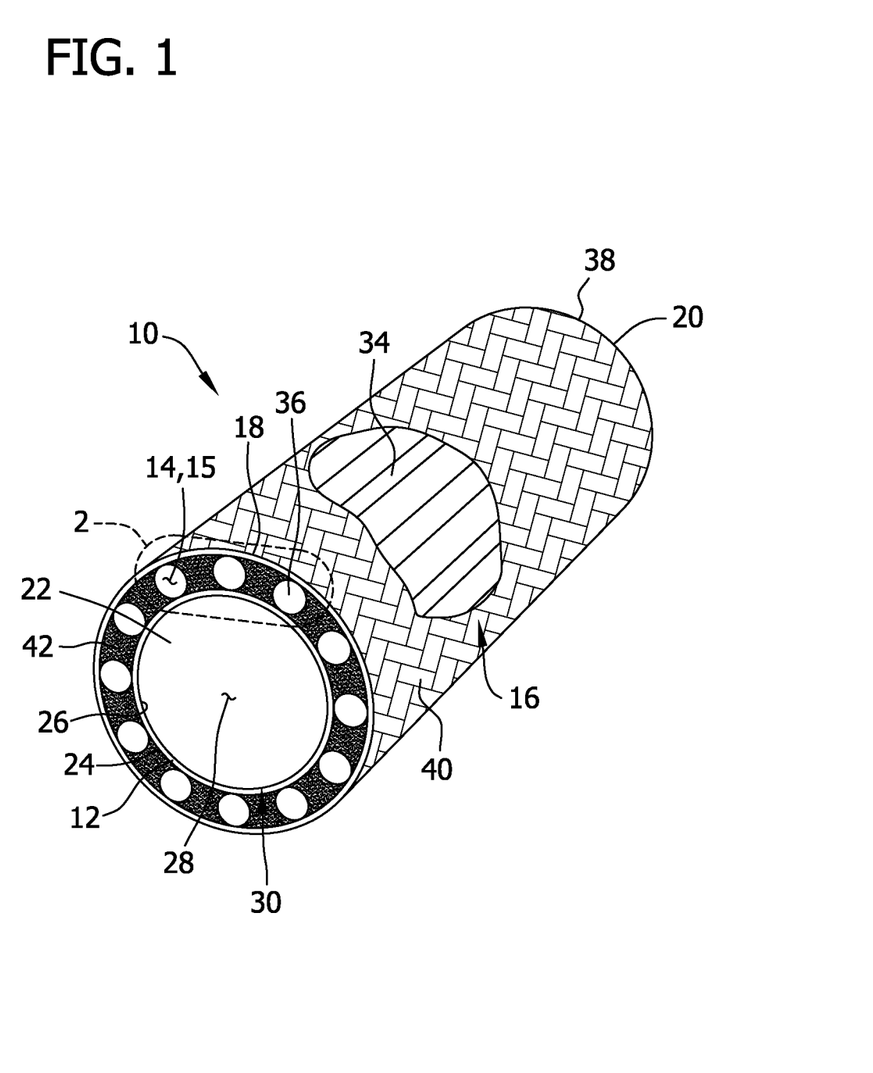
FIG. 1 illustrates a front cross-sectional view of an exemplary composite structure.
Figure 2:
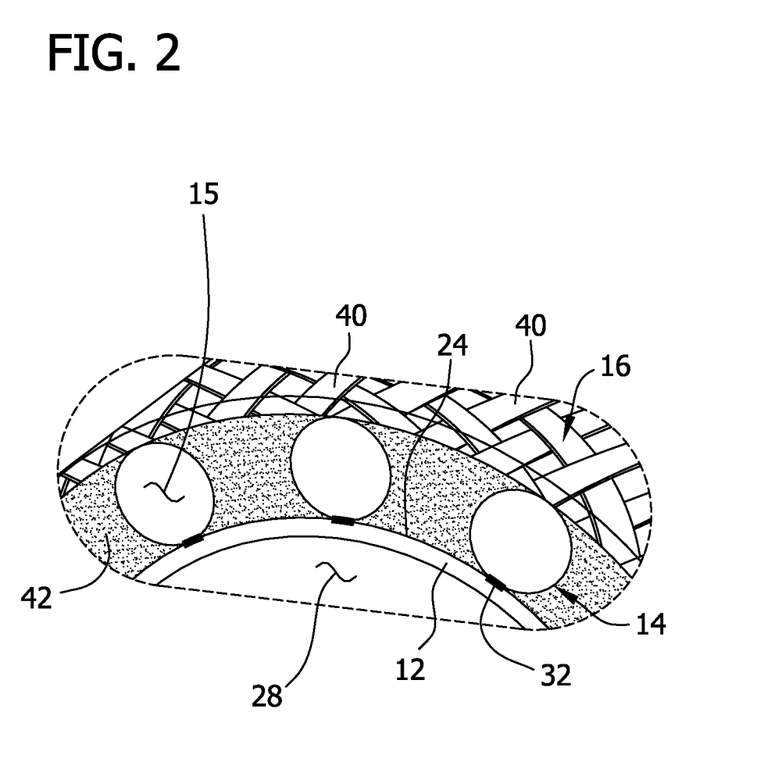
FIG. 2 illustrates a partial cut-away view of the composite structure shown in FIG. 1.

FIG. 1 illustrates a cross-sectional view of an exemplary composite structure 10. FIG. 2 illustrates a partial cut-away view of composite structure 10. Composite structure 10 facilitates providing structural support to structural components (not shown) while minimizing and/or eliminating microcracking that may otherwise occur due to the integration of large volumes of materials with differing stiffness values.

Composite structure 10 includes a base member 12, a support member 14, and a fabric overwrap 16. Base member 12 includes a first end 18, a second end 20, and a body 22 extending between ends 18 and 20. Body 22 includes an outer surface 24 and an inner surface 26. Inner surface 26 defines a channel 28 therethrough. In the exemplary embodiment, base member 12 includes a hollow, preformed tube 30. Alternatively, base member 12 may have other shapes such as, but not limited to, a polygonal shape or any other shape that enables composite structure 10 to function as described therein. Moreover, in the exemplary embodiment, base member 12 is fabricated from a plurality of materials such as, but not limited to, a metallic material, a thermoplastic material, and a reconfigured thermoplastic composite material. In one embodiment, base member 12 is fabricated from an electrically conductive material to enable current flow through composite structure 10. Alternatively, base member 12 may include any materials that enable composite structure 10 to function as described herein. Channel 28 facilitates reducing an overall weight of composite structure 10, as compared to conventional composite structures (not shown), and is sized to accept and contain other components (not shown) therein such as, for example, electrical wiring, piping, and/or tubing.

Support member 14 is coupled to base member 12, such that support member 14 facilitates increasing an overall stiffness of composite structure 10. In the exemplary embodiment, support member 14 couples about outer surface 24. A fastener 32 such as, for example, an adhesive, facilitates coupling support member 14 to outer surface 24. Alternatively, any fastener 32 such as, but not limited to, stitches and/or welds, may be used to couple support member 14 to outer surface 24. In the exemplary embodiment, a plurality of support members 14 is uniformly coupled about outer surface 24. Alternatively, support members 14 may be non-uniformly coupled to and/or about outer surface 24. Any orientation of support members 14 may be used relative to outer surface 24 that enables composite structure 10 to function as described herein.

While support member 14 is illustrated as being a circular rod, any other structural shape may be used. Moreover, while support member 14 is illustrated with having a substantially uniform cross section over its length "L", the cross section and/or size of support member 14 may vary over its length L. In the exemplary embodiment, support member 14 includes a pultruded rod 15 that is formed from structural fibers. Moreover in the exemplary embodiment, pultruded rod 15 has a compressive strength approaching its tensile strength. Pultruded rod 15 may have a generally elongated rod body 34 that may have a generally circular or elliptical cross section.

Pultruded rod 15 may be fabricated by known pultrusion (not shown). Pultrusion includes pulling continuous fibers through a bath of resin, blended with a catalyst and then into pre-forming fixtures where the section is partially pre-shaped & excess resin is removed. Fibers are then passed through a heated die, which can determine the sectional geometry and finish of the final product. Pultruded rod 15 includes +45°, 0°, 90°, 0°, 90°, and −45° oriented fibers. In the exemplary embodiment, pultruded rod 15 includes 0°-oriented fibers and has a cross-sectional size from about 2 mm to about 25 mm. Moreover, in the exemplary embodiment, pultruded rod 15 has a length L as measured between end 36 and end 38 from about 0.1 m to about 100 m. In the exemplary embodiment, pultruded rod 15 includes a circular cross section having 0°-oriented fibers.

Fabric overwrap 16 is coupled to either base member 12 and/or to support member 14. Fabric overwrap 16 includes a plurality of braid or weave strands 40 of structural fibers that are braided and/or interwoven to and about either base member 12 and/or support member 14. In the exemplary embodiment, braid/weave strands 40 are coupled about support member 14. Alternatively, braid/weave strands 40 may couple a support member 14, extend toward and couple to base member 12 and extend and couple to an adjacent support member 14. Braid/weave strands 40 include a variety of structural fiber materials such as, but not limited to, aramid, glass, and/or carbon fibers. Composite structure 10 also includes a resin 42 that is infused and discharged into fabric overwrap 16 to facilitate encapsulating support member 14 about outer surface 24 as will be described. Fabric overwrap 16, in an embodiment, may include a flange (not shown) to facilitate coupling composite structure 10 to another structure such as, but not limited to, a structural skin (not shown).

Figure 3:
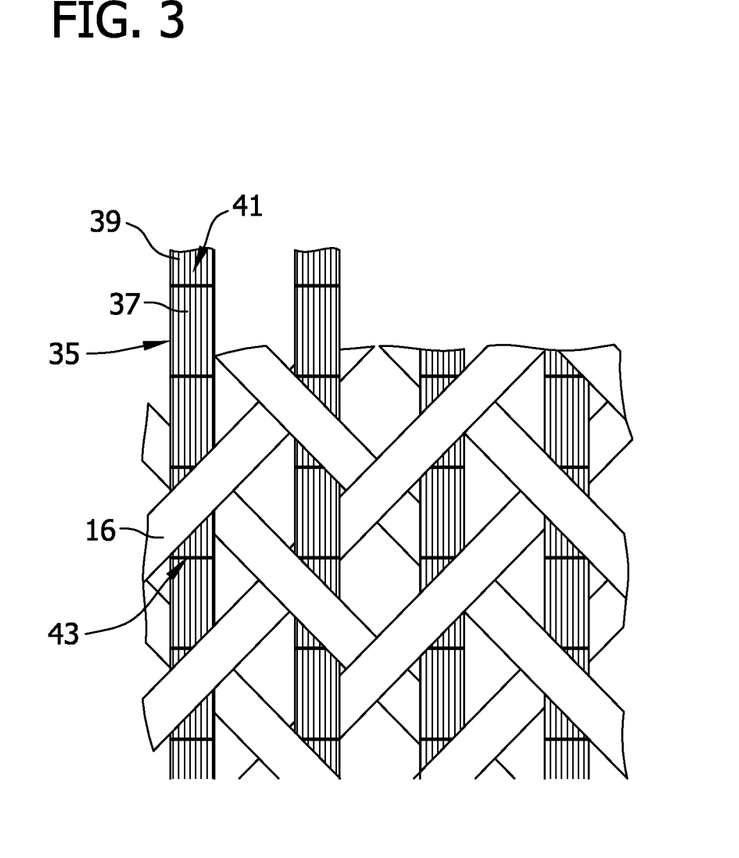
FIG. 3 illustrates a partial view plan view of an exemplary support member that may be used with the composite structure shown in FIG. 1.

FIG. 3 illustrates a partial view plan view of another exemplary support member 35 that may be used for composite structure 10 shown in FIG. 1. In the exemplary embodiment, support member 35 replaces support member 14 shown in FIG. 1. Alternatively, support member 14 and support member 35 may be used together for composite structure 10. Support member 35 may include a unidirectional-tow fabric 37 that includes a bundle of fibers 39 with a majority 41 of fibers 39 oriented in one direction. A minority 43 of fibers 39 and/or other material may be oriented in other directions in order to facilitate holding majority 41 of fibers 39 in a desired position.

Figure 4:
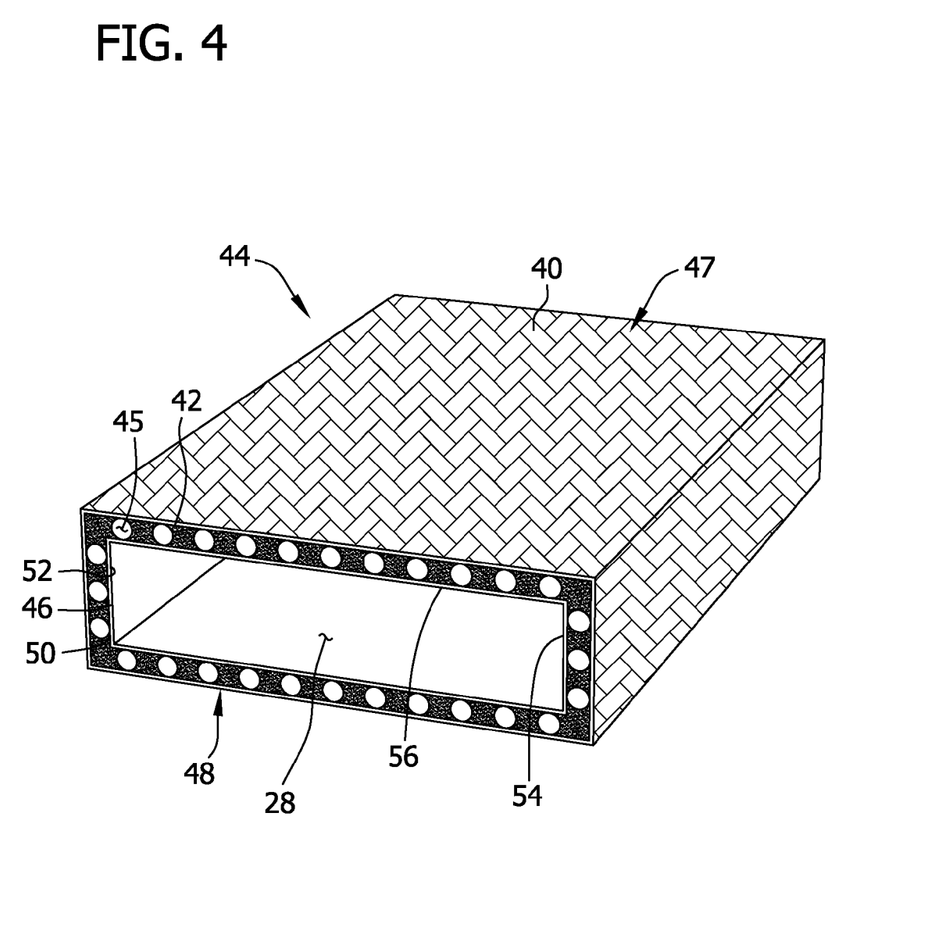
FIG. 4 illustrates a front cross-sectional view of another exemplary composite structure.

FIG. 4 illustrates a cross-sectional view of another exemplary composite structure 44. In the exemplary embodiment, composite structure 44 includes a support member 45, a base member 46, and a fabric overwrap 47. Moreover, in the exemplary embodiment, base member 46 has a polygonal shape 48. More particularly, base member 46 has a rectangular shape that includes an outer surface 50 and inner surface 52. Moreover, base member 46 includes a pair of first opposing sides 54 and a pair of second opposing sides 56. In the exemplary embodiment, support members 45 are coupled to sides 54 and 56. Alternatively, support member 45 may be coupled to either side 54 or 56. Fabric overwrap 47 is coupled to support member 45 and base member 46 as previously described.

Figure 5:
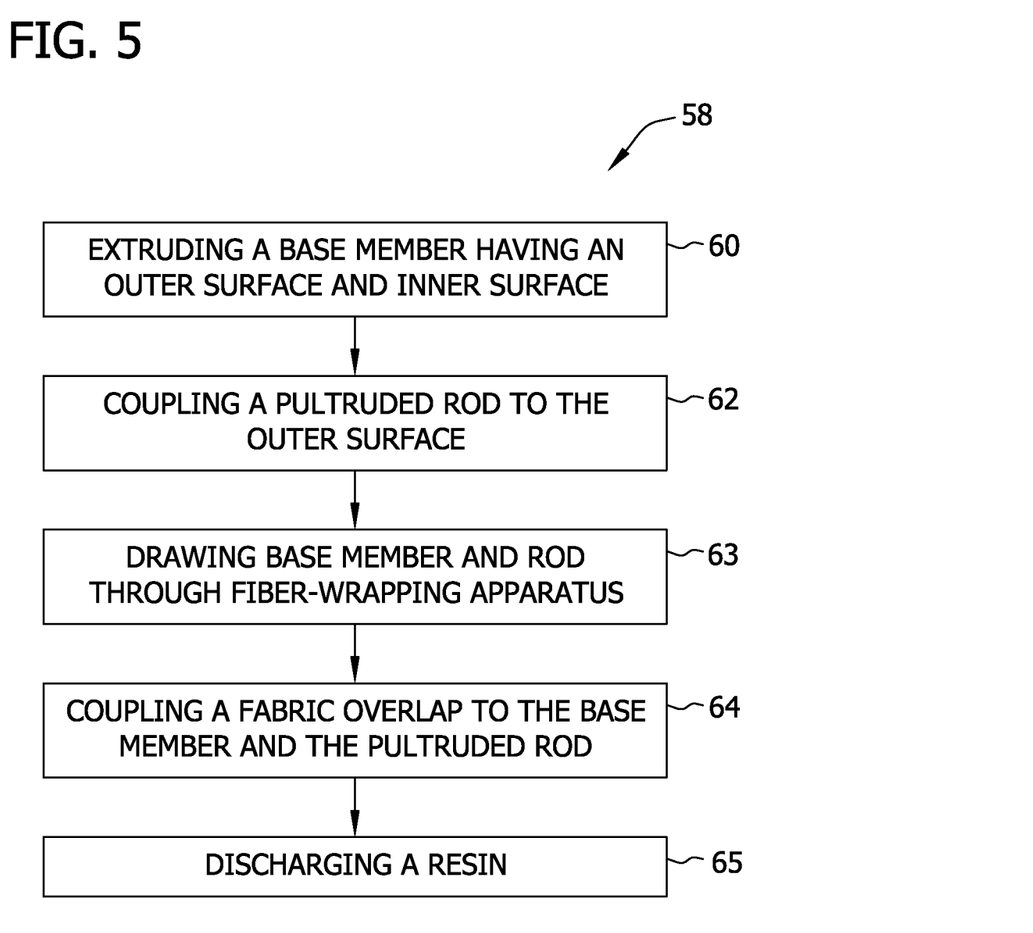
FIG. 5 illustrates a flow chart of an exemplary method of assembling a composite structure.

FIG. 5 illustrates a flow chart of an exemplary method 58 of assembling a composite structure, for example composite structure 10 (shown in FIG. 1). During assembly, base member is extruded 60, such as base member 12 (shown in FIG. 1). In the exemplary embodiment, base member is extruded 60 to have an outer surface and an inner surface, for example, outer and inner surfaces 24 and 26, respectively (shown in FIG. 1). Moreover, method 58 includes extruding 60 base member to include a plurality of different configurations such as, but not limited to, polygonal and circular shapes. The inner surface is formed such that a channel, such as channel 28 (shown in FIG. 1) is defined therein.

Method 58 also includes coupling 62 a support member, such as pultruded rod 15, (shown in FIG. 1) to the outer surface. In the exemplary embodiment, a plurality of pultruded rods is coupled 62 substantially about the outer surface. In one embodiment, method 58 includes forming pultruded rod with 0° oriented fibers. Moreover, for a polygonal base member, pultruded rods may be coupled 62 to each side of the outer surface. In an embodiment, a fastener facilitates coupling 62 the pultruded rod to base outer surface.

In the exemplary embodiment, a fabric overwrap, such as fabric overwrap 16 (shown in FIG. 1), is coupled 64 to at least one of base member and pultruded rod. More particularly, base member and pultruded rods are coupled 64 thereto and are overwrapped as base member and pultruded rods are drawn 63 through a braider, loom, or fiber-wrapping apparatus (not shown), in contrast to known processes of stitching a braid to a support member and pulling a pultruded rod through the fiber. Alternatively, base member and pultruded rod may be drawn through an existing fabric overwrap having an opening within the fabric overwrap. After overwrap fabric is coupled to pultruded rod and base member, method 58 includes discharging 65 a resin into the fabric overwrap to encapsulate support member to base member to facilitate forming a composite structure.

Figure 6:
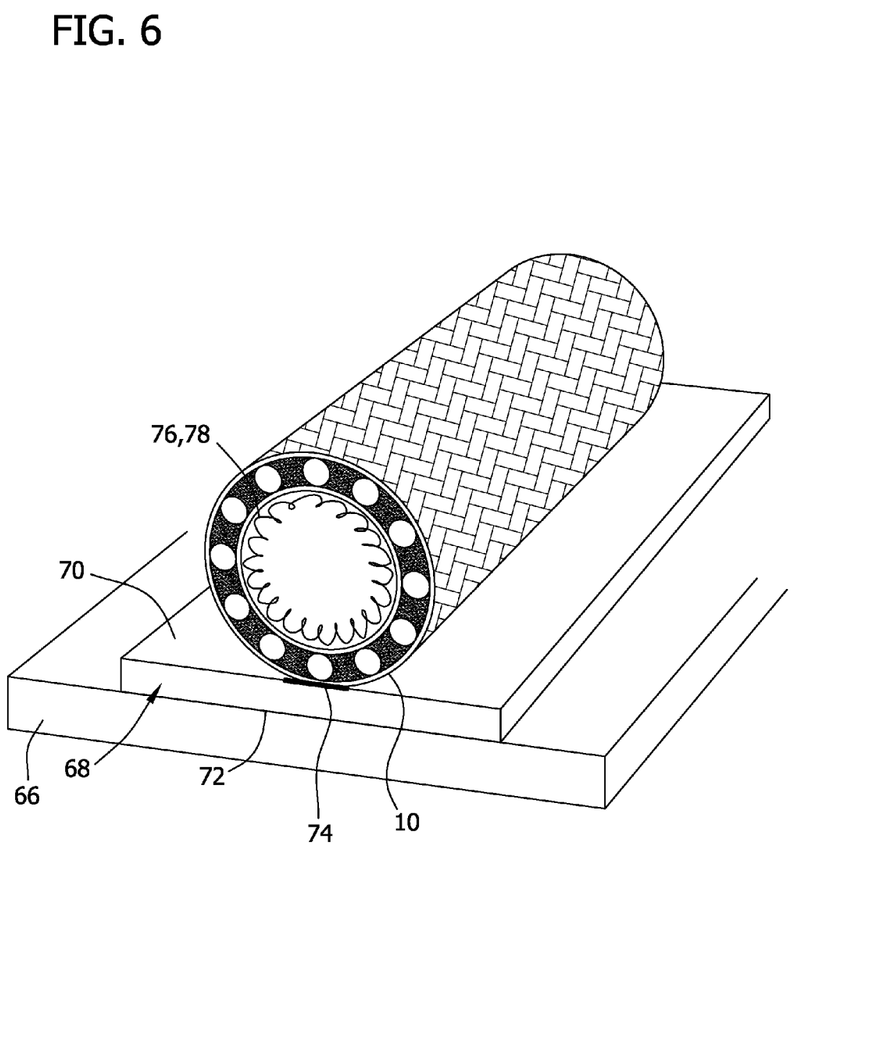
FIG. 6 illustrates a front view of the composite structure of FIG. 1 that may be used with a fuselage skin.

FIG. 6 illustrates a front view of composite structure 10 shown in FIG. 1 that may be used with a fuselage section 66. Fuselage section 66 includes a fuselage skin 68. Fuselage skin 68 includes a first surface 70 and a second surface 72, wherein composite structure 10 is coupled to first surface 70. In the exemplary embodiment, a fastener 74 such as, for example, a stitch facilitates fastening composite structure 10 to first surface 70.

Fuselage section 66 further includes a component 76 positioned within channel 28. More particularly, component 76 includes an electrical component 78 such as, but not limited to, wiring that is contained by inner surface 26. Alternatively, component 76 may include piping, tubing and stiffening members (not shown). Any component 76 may be contained by inner surface 26 to enable fuselage section 66 to function as described herein.

Figure 7:
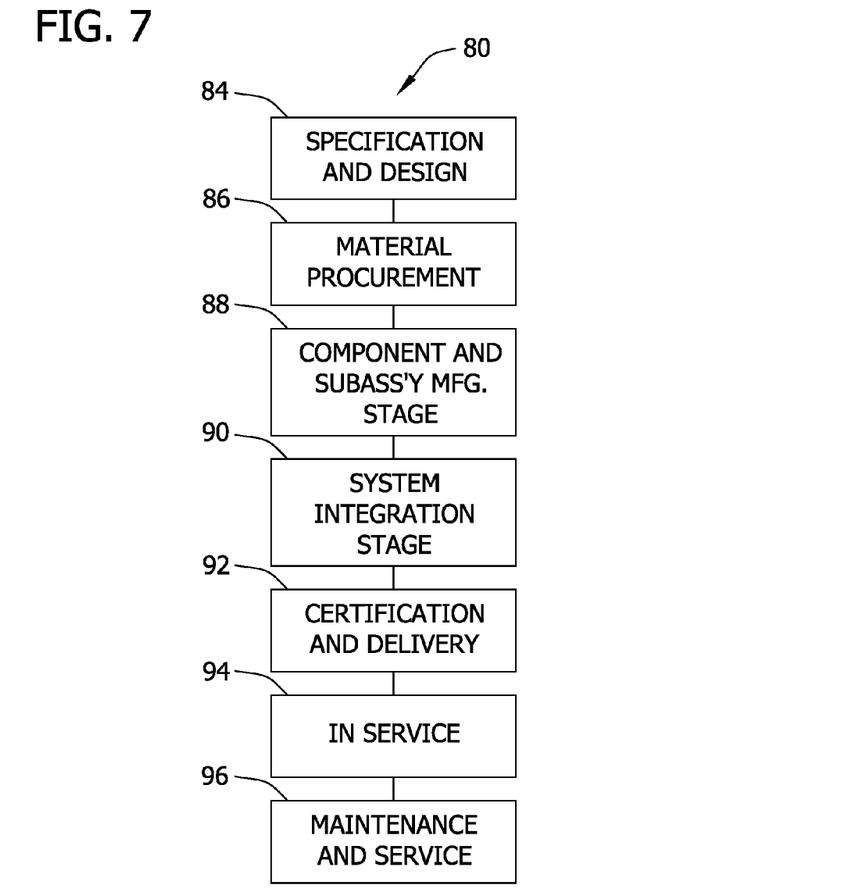
FIG. 7 illustrates a flow diagram of an aircraft production and service methodology.
Figure 8:
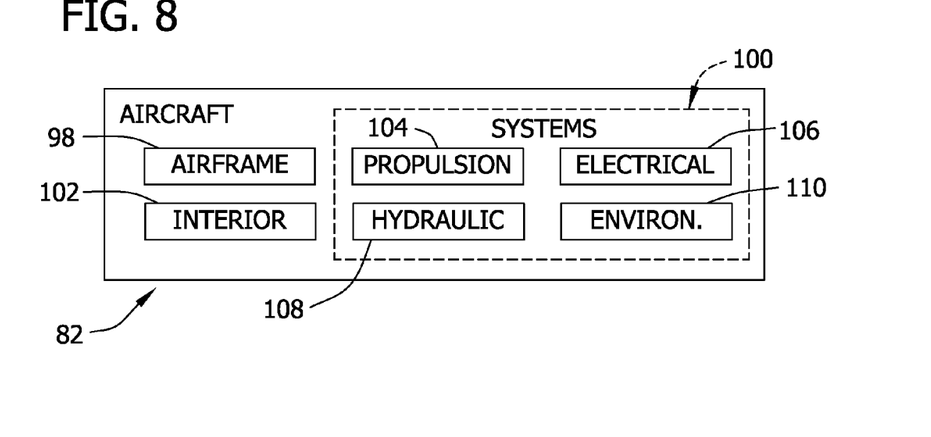
FIG. 8 illustrates a block diagram of an exemplary aircraft.

The embodiments of the disclosure may be described in the context of an aircraft manufacturing and service method 80 as shown in FIG. 7 and an aircraft 82 as shown in FIG. 8. During preproduction, exemplary manufacturing and service method 80 may include specification and design 84 of the aircraft 82, and material procurement 86. During production, component and subassembly manufacturing stage 88 and system integration stage 90 of the aircraft 82 takes place. Thereafter, the aircraft 82 may go through certification and delivery 92 in order to be placed in service 94. While in service by a customer, the aircraft 82 is scheduled for routine maintenance and service 96 (which may also include modification, reconfiguration, refurbishment, and so on).

Each of the processes of manufacturing and service method 80 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 82 produced by exemplary manufacturing and service method 80 may include an airframe 98 with a plurality of systems 100 and an interior 102. Examples of systems 100 include one or more of a propulsion system 104, an electrical system 106, a hydraulic system 108, and an environmental system 110. Any number of other systems may be included. Although an aerospace example is shown, the principles of the invention may be applied to other industries, such as the automotive industry.

Apparatus and methods embodied herein may be employed during any one or more of the stages of manufacturing and service method 80. For example, components or subassemblies corresponding to production process 88 may be fabricated or manufactured in a manner similar to components or subassemblies produced while the aircraft 82 is in service. Also, one or more apparatus embodiments, method embodiments, or a combination thereof may be utilized during the stages 88 and 90, for example, by substantially expediting assembly of or reducing the cost of an aircraft 82. Similarly, one or more of apparatus embodiments, method embodiments, or a combination thereof may be utilized while the aircraft 82 is in service, for example and without limitation, to maintenance and service 96.

The embodiments described herein enable making a self-supporting, lightweight cross section for liquid molding that may be designed to provide a desired stiffness or weight and which, with proper selection of materials, can provide multi-functionality, and minimize and/or eliminate microcracking due to the integration of large volumes of material with large differences in stiffness. Furthermore, the embodiments described herein minimize and/or eliminate secondary operations or steps to introduce pultruded rods and/or large bundles of collimated fibers and/or unidirectional tows through the fabric overwrap. Use of 0°-oriented pultruded rods and/or unidirectional fabric tows allows for smaller volumes and resin to transfer shear load from 0° fibers to the rest of composite structure.

More particularly, the embodiments described herein enable minimizing and/or eliminating cracking that occurs between the protruded rod and the surrounding fabric overwrap while minimizing and/or eliminating the manufacturing complexity of having to pull the pultruded rod through a dry preform. The use of relatively large pultruded rods in commonly known composite structures causes a large area of stress concentration around the rod, such that any debonding dramatically reduces the ability of load to be transferred between the pultruded rod and the surrounding preform. The embodiments further include hollow center sections for weight reduction and increased stiffness as a stiffness is provided more effectively by concentrating 0°-oriented fibers on the base outer surface.

Center hollow channel may be used for insertion of wiring or other systems. Moreover, center hollow channel may be made of metallic material that may be used as part of a current return network. In one embodiment, center hollow channel may not be load-bearing, so any debonding between it and the surrounding fabric overwrap can be made benign.

The embodiments described herein provide for a reduced weight at similar or lower costs as compared to conventional braiding approaches with improvements in quality control and reductions to potential for preform damage from having to introduce high-stiffness, pultruded rods into the braided or woven fabric overwraps.

The embodiments described herein enable a very efficient airframe structure having the skin, stringers, and frame elements which maintain residual load-carrying capabilities under a variety of damage scenarios. The embodiments enable higher operating strains and ultimately a lighter airframe. In addition to the improved structural performance, embodiments of, for example, dry-carbon fiber, pultruded rods, and stitching thread may also provide manufacturing advantages. A self-supporting stitched preform design of various embodiments may include an out-of-autoclave fabrication that may provide orders-of-magnitude lower building costs than would otherwise be possible using traditional composite design and manufacturing practices.

The embodiments enable larger one-piece co-cured panel designs with transitions and damage-arrest interfaces. Moreover, the embodiments also enable performance and cost advantages that are capable of enabling a whole new generation of highly-contoured aircraft designs that may result in substantially improved mission capabilities and lower life-cycle costs for future aircraft, including military aircraft.

Exemplary embodiments of systems and methods for a composite structure are described above in detail. The systems and methods are not limited to the specific embodiments described herein, but rather, components of systems and/or steps of the method may be utilized independently and separately from other components and/or steps described herein. The exemplary embodiments may be utilized in a Pultruded Rod Stitched Efficient Structure, known as the PRSEUS structural design. The disclosed dimensional ranges include all sub-ranges there between. Further, composite structure may be fabricated from any material that enables structure to function as described herein. Each component and each method step may also be used in combination with other components and/or method steps. Although specific features of various embodiments may be shown in some drawings and not in others, this is for convenience only. Any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A composite structure comprising:
   a base member comprising an outer surface and an inner surface, said inner surface defining a channel therethrough;
   a plurality of unidirectional fiber tows positioned about said outer surface, wherein said plurality of unidirectional fiber tows are formed from a majority of fibers oriented in a first direction and a minority of fibers oriented in a second direction, said minority of fibers configured to hold said majority of fibers together; and
   a fabric overwrap comprising strands of structural fibers, said fabric overwrap coupled to said plurality of unidirectional fiber tows and to said outer surface of said base member, wherein said strands of structural fibers are interwoven to and about said base member and said plurality of unidirectional fiber tows such that said plurality of unidirectional fiber tows are coupled to said outer surface.

2. The composite structure of claim 1 wherein said base member comprises a hollow preform tube.

3. The composite structure of claim 1 wherein said base member comprises at least one of a polygonal shape and a circular shape.

4. The composite structure of claim 1 wherein said base member comprises at least one of a metallic, thermoplastic and reconfigured thermoplastic composite material.

5. The composite structure of claim 1 wherein said base member comprises an electrically conductive material.

6. The composite structure of claim 1 wherein said fabric overwrap comprises a flange.

7. The composite structure of claim 1, wherein an amount of resin is substantially infused into said fabric overwrap.

8. The composite structure of claim 7 wherein said resin is configured to encapsulate said plurality of unidirectional fiber tows.

9. A fuselage section comprising:
   a fuselage skin; and
   a composite structure coupled to said fuselage skin, said composite structure comprising:
      a base member comprising an outer surface and an inner surface, said inner surface defining a channel therethrough;
      a plurality of unidirectional fiber tows positioned about said outer surface, wherein said plurality of unidirectional fiber tows are formed from a majority of fibers oriented in a first direction and a minority of fibers oriented in a second direction, said minority of fibers configured to hold said majority of fibers together;
      a fabric overwrap comprising strands of structural fibers, said fabric overwrap coupled to said plurality of unidirectional fiber tows and to said outer surface of said base member, wherein said strands of structural fibers are interwoven to and about said base member and said plurality of unidirectional fiber tows such that said plurality of unidirectional fiber tows are coupled to said outer surface.

10. The fuselage skin of claim 9 further comprising an electrical component coupled to said inner surface.

11. The fuselage skin of claim 9 wherein said base member comprises at least one of a polygonal and a circular shape.

* * * * *